US008314558B2

(12) United States Patent
Dassanayake et al.

(10) Patent No.: US 8,314,558 B2
(45) Date of Patent: Nov. 20, 2012

(54) LIGHT EMITTING DIODE HEADLAMP FOR A VEHICLE

(75) Inventors: Mahendra Somasara Dassanayake, Bloomfield Hills, MI (US); Donald Paul Bilger, Livonia, MI (US); Arun Kumar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 12/685,898

(22) Filed: Jan. 12, 2010

(65) Prior Publication Data

US 2011/0169410 A1 Jul. 14, 2011

(51) Int. Cl.
*B60Q 1/02* (2006.01)

(52) U.S. Cl. .......................................... 315/82; 362/507

(58) Field of Classification Search .................... 315/77, 315/82; 362/487, 507, 543, 545; 307/10.1, 307/10.8

See application file for complete search history.

(56) References Cited

U.S. PATENT DOCUMENTS

| | | | | |
|---|---|---|---|---|
| 6,443,594 | B1 | 9/2002 | Marshall et al. | |
| 6,891,333 | B2 * | 5/2005 | Tatsukawa et al. | 315/82 |
| 6,953,274 | B2 | 10/2005 | Rice | |
| 7,144,145 | B2 * | 12/2006 | Watanabe et al. | 362/544 |
| 7,188,984 | B2 | 3/2007 | Sayers et al. | |
| 7,201,506 | B2 | 4/2007 | Ishida et al. | |
| 7,232,247 | B2 | 6/2007 | Yatsuda et al. | |
| 7,258,474 | B2 | 8/2007 | Valcamp et al. | |
| 7,484,872 | B2 * | 2/2009 | Yatsuda et al. | 362/545 |
| 7,651,252 | B2 * | 1/2010 | Kim | 362/545 |
| 7,744,261 | B2 * | 6/2010 | Fukawa et al. | 362/543 |
| 2002/0034710 | A1 | 3/2002 | Morris et al. | |
| 2004/0202007 | A1 * | 10/2004 | Yagi et al. | 362/545 |
| 2004/0208020 | A1 * | 10/2004 | Ishida | 362/545 |
| 2005/0018443 | A1 * | 1/2005 | Tsukamoto | 362/539 |
| 2006/0007697 | A1 | 1/2006 | Ackermann | |
| 2006/0164853 | A1 | 7/2006 | Moisel | |
| 2007/0236952 | A1 | 10/2007 | Chinniah et al. | |
| 2008/0068853 | A1 | 3/2008 | Kim | |

OTHER PUBLICATIONS http://www.knightlight.biz/headlights.php, Knightlight LED AFS Headlights, "The Evolution of Car Headlights", printed May 12, 2008, 4 pages.

http://www.ledsmagazine.com/features/4/12/7, LEDs Magazine—Hella develops LED headlamp prototype, Copyright 2007-2008 Penwell Corporation, 1 page.

http://www.rpcphotonics.com/collimators.asp, "LED Collimators", Copyright 2007-2008 RPC Photonics, 3 pages.

* cited by examiner

*Primary Examiner* — Thuy Vinh Tran

(74) *Attorney, Agent, or Firm* — Brooks Kushman P.C.; Frank A. MacKenzie

(57) ABSTRACT

A vehicle exterior lamp is provided with an array of light emitting diodes (LEDs) with rows and columns and each LED positioned at an intersection thereof. An LED is illuminated by selectively applying a signal to the row and column corresponding to the LED position. A vehicle headlamp lighting system is provided with an array of LEDs with rows and columns, and each LED positioned at a row and column intersection. The lighting system has a control module for selectively illuminating the LEDs by applying a signal to the rows and to the columns corresponding to the location of the LEDs to be illuminated. A vehicle headlamp is provided with an optical structure for reflection and refraction of light and LEDs. Light emitted by the LEDs interacts with the optical structure and exits the headlamp in a generally perpendicular direction to the LED emitted light.

18 Claims, 14 Drawing Sheets

LUMINANC
(cd/m$^2$)

LUMINANCE
(cd/m$^2$)

LUMINANCE
(cd/m$^2$)

LIGHT EMITTING DIODE HEADLAMP FOR A VEHICLE

BACKGROUND

1. Technical Field

The invention relates to light emitting diode (LED) headlamp lighting systems for use in vehicles.

2. Background Art

It is known in the art to provide passenger vehicles with projector headlamp systems. Most projector headlamp systems in current production combine a halogen or High Intensity Discharge (HID) source with a reflector, a lens, a cutoff shield to control the beam pattern, and a transparent cover that protects working parts and enhances appearance.

Active vehicle headlight systems including Steerable or Advanced Front-Lighting and Adaptive Front Lighting Systems (AFS) are known in the art. AFS systems rotate the headlamp projector around its vertical axis to allow steering of the light beam as the vehicle corners. Some automobiles include headlamp systems mechanically integrated with the steering mechanism so the lights follow the movement of the front wheels. Headlamp leveling systems are also known in the art. Headlamp leveling systems rotate the projector around its horizontal axis to adjust the beam pattern for variations in vehicle trim height due to loading. When combining AFS and leveling systems, a gimbal mount may be used to allow two-axis rotation of the projector.

Actuated headlamp systems provide headlamp beam illumination as a car is turned and for a variety of driving conditions. Further, beam height adjustment has been used to compensate headlamp illumination for rear seat occupancy or vehicle loading. The aim of the headlamp beam is lowered as the rear of the vehicle is loaded with passengers and cargo. Usually such adjustment is controlled through an internal, typically wheeled, adjustment. Automatic self-leveling has become increasingly common as light sources have become brighter and the potential hazards of glare to other drivers have increased.

Light emitting diode (LED) headlamps and tail lamps are used in vehicles. LED headlamps consume less energy that halogen bulbs or HID lamps, and have a longer lifetime before replacement.

SUMMARY

In one embodiment, a vehicle headlamp has a plurality of light emitting diodes (LEDs) positioned into an array. The array has at least one row and at least two columns with each LED positioned at an intersection of a row and a column. At least one of the LEDs is illuminated by selectively applying a signal to the row and a signal to the column corresponding to the position of the LED.

In another embodiment, a vehicle headlamp has a lighting system with a plurality of light emitting diodes (LEDs) arranged into an array. The array has at least two rows and at least two columns, with each LED positioned at a row and column intersection. The lighting system has a control module for selectively illuminating at least one of the plurality of LEDs by applying a signal to at least one row and a signal to at least one column corresponding to the location of the LEDs to be illuminated.

In yet another embodiment, a vehicle headlamp has an optical structure for at least one of reflection and refraction of light and a plurality of light emitting diodes (LEDs) for selectively emitting light. The light emitted by the LEDs is directed towards the optical structure, interacts with the optical structure, and the light then exits the headlamp in a generally perpendicular direction to the LED emitted light.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
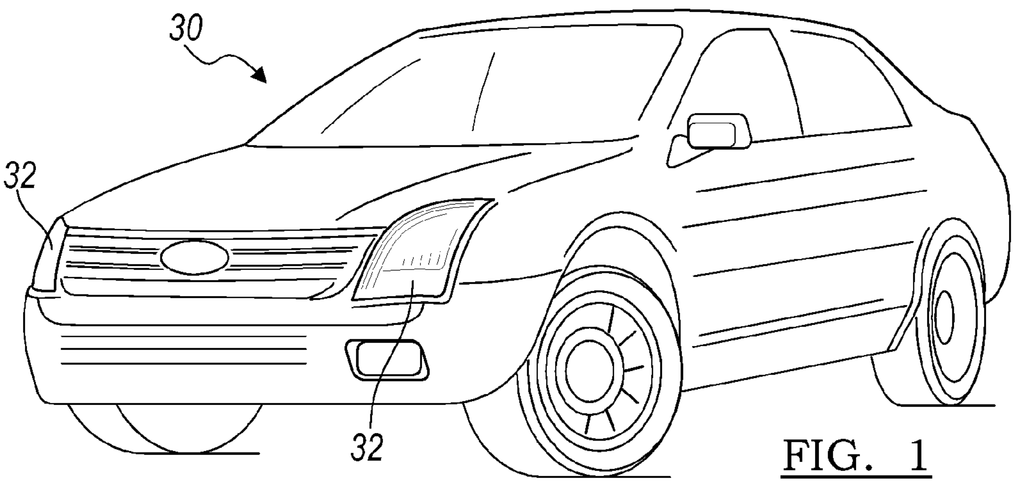
FIG. 1 is a perspective view of a vehicle with a headlamp according to an embodiment.

FIG. 1 shows a vehicle 30 with a pair of front lighting systems 32. Each front lighting system 32 is a light emitting diode (LED) headlamp that can contain a forward lighting system as well as a turn signal, emergency lighting system, park lamp, fog lamp, or the like. The front lighting system 32 is an adaptive front lighting system (AFS) that can adjust the headlamp for high or low beam function during cornering, for vehicle speed, or other vehicle functions without moving parts. Additionally, the headlamp 22 may be adjusted for environmental states such as adverse weather, urban or rural roadway, or the like. The LEDs 34 of the headlamp 32 emit light in the visible spectrum. The light emitted is broadband visible light (i.e. white light), or may be tuned to a narrower wavelength to obtain a desired color of light such as red or amber. In another embodiment, light from the LEDs 34 is emitted in the infrared region, leading to further applications of the headlamp 32 when there are low ambient lighting levels.

Figure 2:
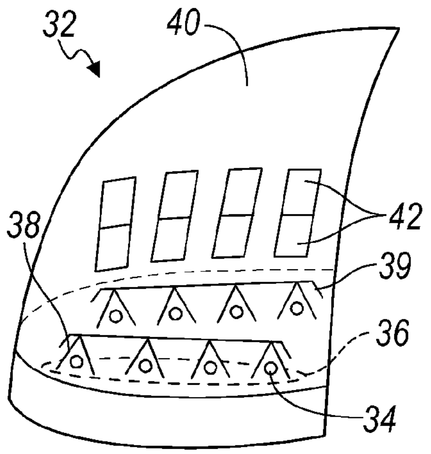
FIG. 2 is a perspective view of a headlamp according to an embodiment.
Figure 3:
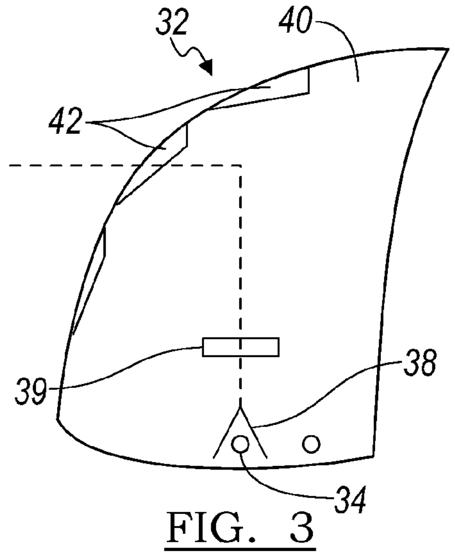
FIG. 3 is a side section view of the headlamp of FIG. 2.

An embodiment of the headlamp 32 is shown in FIGS. 2 and 3 with a series of LEDs 34 arranged into two arrays 36. An LED 34 in the array 36 directs light in a generally upward direction, the light then interacts with near field collimator 38 which collimates the light into a beam. The collimator 38 is used to create light in parallel beams from the diverging LED light from the LED 34 point source. The LED 34 or array 36 is part of an overmolded chip with silicone, with the silicone in the overmolded chip forming a precollimated beam of light. Alternatively, the light from the LEDs 34 is incoherent and then collimated by a collimator 38. The collimator 38 takes diverging light from a point source, such as the LED 34, and redirects or bends the light to travel in parallel paths. The collimated light is directed through a prism 39 which spreads the light, and then through the lens 40 and in a forward (or otherwise determined) direction out of the vehicle 30. The lens 40 may be located a fixed distance from the LED array 36 and collimators 38.

The lens 40 is a sheet of microreplicated lenses 42, incorporated by reference from U.S. Pat. No. 7,033,736 to Morris et al., with optics to form a beam directed out of the vehicle 30. The sheet of microreplicated lenses 42 is either part of the lens 40, which may be a headlamp cover, or it can be separate from the headlamp cover and interposed between the LEDs 34 and the outer cover 40. The microreplicated lenses 42 interact with the light emitted from the LEDs 34. The microreplicated lenses 42 direct or focus the light into a beam, and may additionally collimate the light and control the beam spread. The microreplicated lenses 42 can contain lens features, prism features, and/or other optical features as are known in the art.

The microreplicated lenses 42 contain prisms, or the like, to direct and turn the light, as shown in FIG. 3. For example, the lens 40 directs the light from the array 36 through an approximately ninety degree turn. The light is emitted by an LED 34 in the array 36 in a generally upward direction, through a microreplicated lens 42 to redirect the light, and then the light is directed forward and out of the vehicle 30. Of course, other directions are contemplated as would be desired for the vehicle 30 operation. The headlamp 32 orientation of FIGS. 2-3, with the LEDs 34 directing light in a generally upward direction, allows the headlamp 32 to occupy less volume in the vehicle 30. The upright orientation also allows for the headlamp 32 to be packaged into the front bumper and front fascia of the car and not rearward into the engine compartment and hood space, as is common in the prior art.

Figure 4:
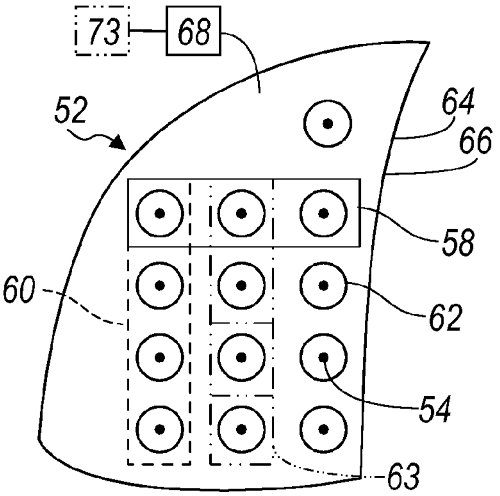
FIG. 4 is a perspective view of a headlamp according to another embodiment.

Another embodiment of the headlamp 52 is shown in FIG. 4. The LEDs 54 are arranged into a series of rows 58 and columns 60 to form the LED array 56. The LEDs 54 transmit light directly through a near field collimator 62, through a prism 63, the lens 64, and forward out of the vehicle 30 to form the beam. A sheet of microreplicated lenses 66 interact with the collimated light to form a beam pattern 70. The microreplicated lenses 66 are integrally molded with the lens 64, connected to the lens 64, or spaced apart therefrom.

Each LED 54 is positioned at an intersection of a row 58 and a column 60, each LED 54 therefore has a matrix address within the LED array 56. Illumination of the LEDs 54 is controlled through a controller 68. The controller 68 sends a signal to a row 58 and a column 60 to illuminate the LED 54 located at a position corresponding to that row 58 and that column 60. Multiple LEDs 54 may be illuminated using the controller 68 by sending a signal to more than one row 58 and/or more than one column 60 through the use of matrix addressing, with each LED 54 assigned to a matrix address based on the row 58 and column 60 location.

Figure 5:
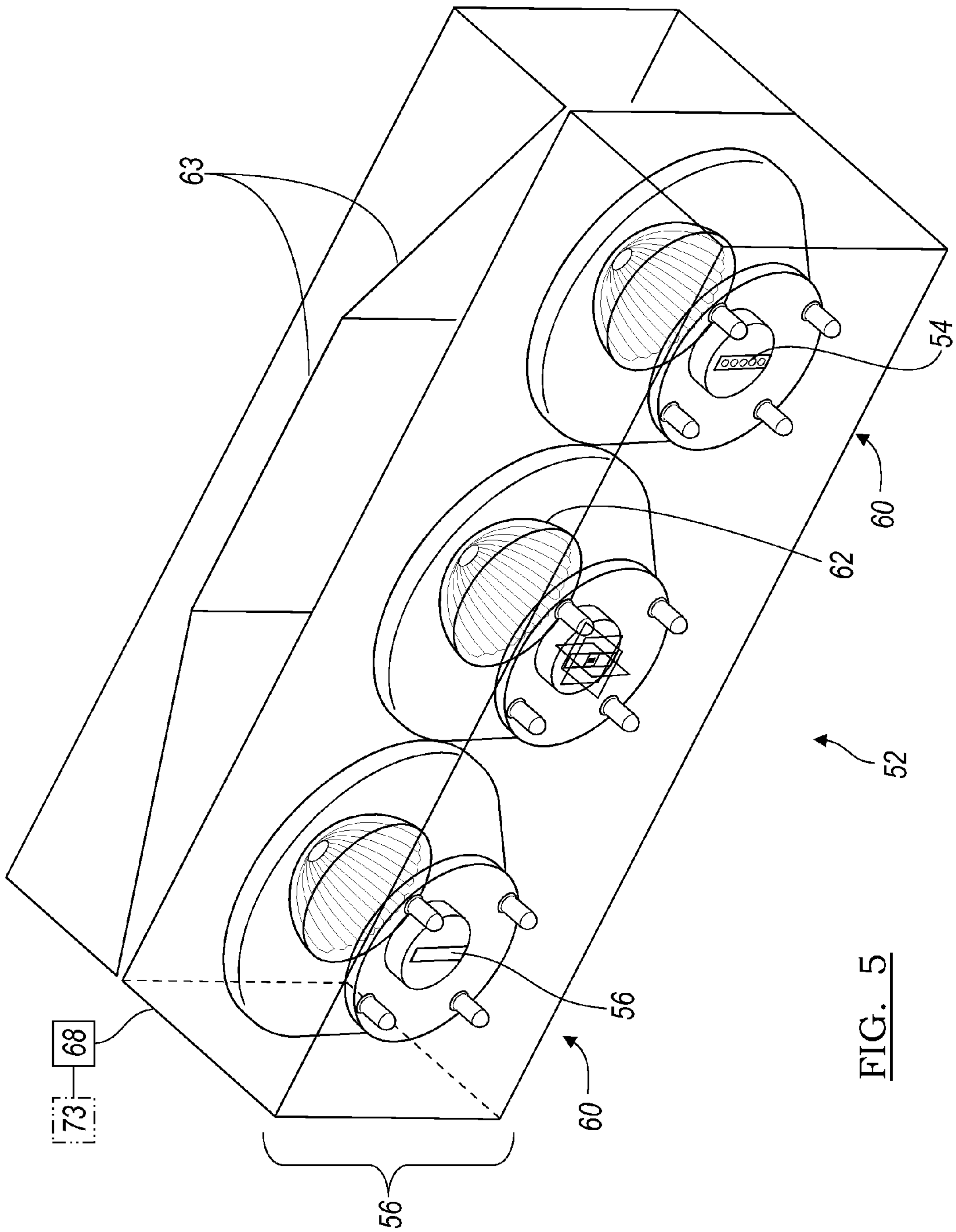
FIG. 5 is a perspective view of a lighting array according to yet another embodiment.

FIG. 5 depicts a lighting system 52 with three arrays 56 of LEDs 54 arranged into one row 58 and five columns 60. Of course, the LEDs in the array 56 could also be five rows and one column, or any other number of rows and columns. The LEDs 54, collimators 62 and prisms 63 are shown.

Figure 7:
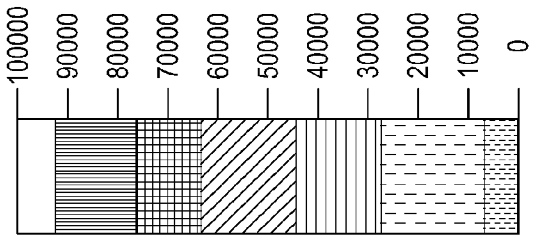
FIG. 7 is a luminance scale (cd/m^2) for FIG. 6.
Figure 6:
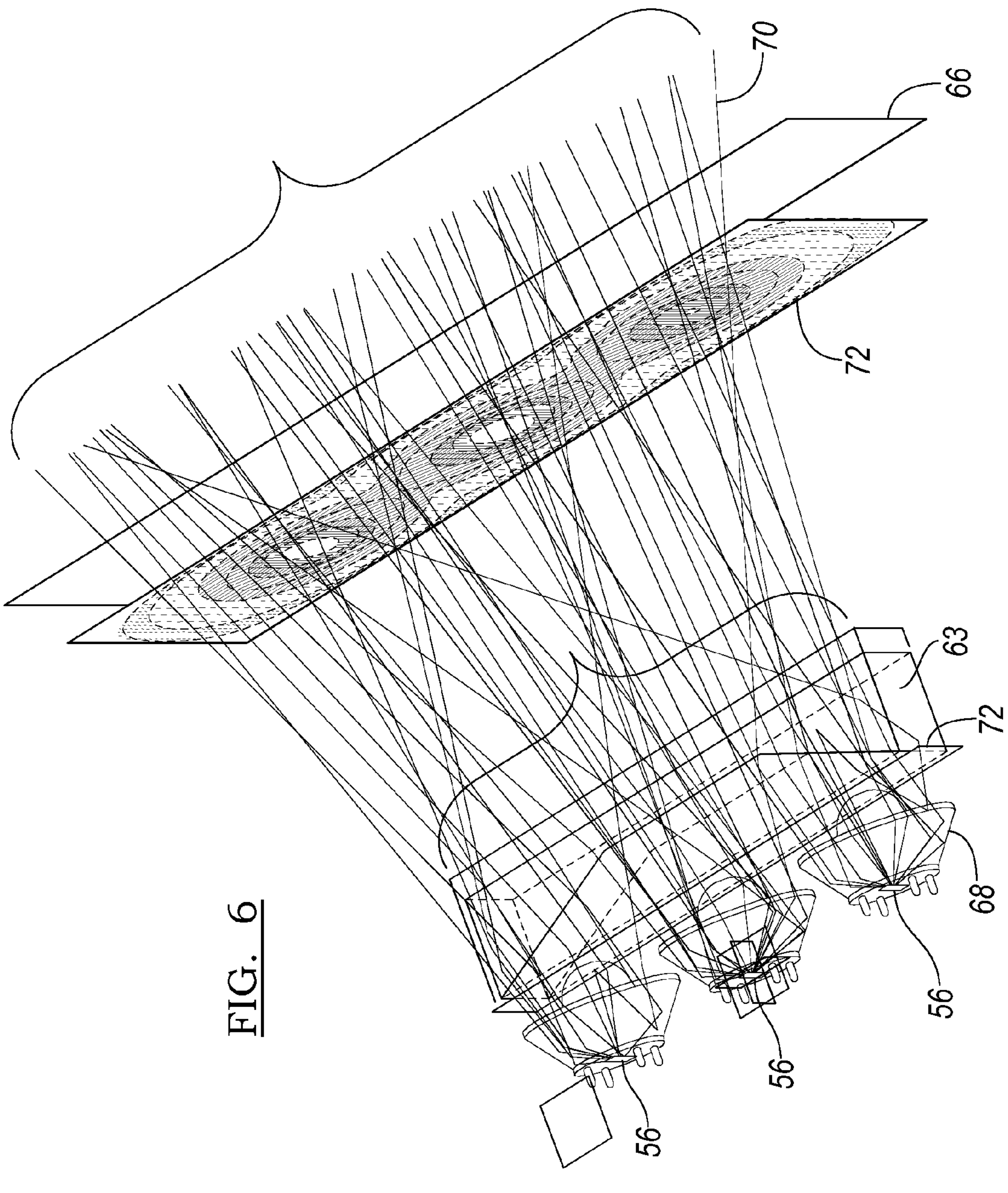
FIG. 6 is a schematic illustrating light mapping using the array of FIG. 5.

FIG. 6 shows light or beam maps when all three arrays 56 of FIG. 5 are illuminated. FIG. 7 is the luminance scale in cd/m^2 or candela per square meter corresponding to FIG. 6. Of course, only one, or two arrays 56 may be illuminated, or only a portion of the LEDs 54 in an array 56 may be illuminated. The LEDs 54 each emit light, which travels through a collimator 62 and a prism 63 to form a footprint 72. The microreplicated lens 66 allows for greater spatial separation of the beam when it is projected forward of the vehicle 30. The collimator 62 collimates the light from the array 56. The prism 63 allows for greater spatial separation of light from the LEDs and forms the footprint 72.

The light from the footprint 72 then travels out the microreplicated lens 66 and out of the vehicle 30 to form a beam pattern 70. The microreplicated lens 66 contains prism optics, or the like, to bend the light and from the LEDs 54 on either end of the array 56 and to form the outer portion of the beam 70. The microreplicated lens 66 allows for beam shaping and helping to create the down the road and spread lighting desired when it is projected forward of the vehicle 30. The microreplicated lens 66 may contain local prisms or wedges or other optics to interact with select LED 54 or array 56 light to assist in creating specific beam patterns 70 as needed for swing or other features. Swing refers to the beam pattern 70 that may be used for vehicle 30 steering operations.

An illuminated footprint 72 is formed by the LED array 56 using the controller 68. The controller 68 sends a signal to at least two of the LEDs 54 by selectively applying a voltage to the rows 58 and the columns 60 corresponding to the positions of the LEDs 54 to be illuminated. The controller 68 may produce different footprints 72 for different desired beam patterns 70 and shapes by selectively illuminating LEDS 54 in the arrays 56. For example, the controller 68 sends a signal to the headlamp 52 to create a footprint 72 within the LED arrays 56. The light emitted by the footprint 72 then interacts with the sheet of microreplicated lenses 66 to form a predetermined beam pattern or shape 70. The beam pattern 70 may be a predetermined spread light beam pattern, a predetermined down the road beam pattern, or a combination based on the optics in the microreplicated lenses 66.

The controller 68 causes the headlamp 52 to illuminate one of the footprints 72 in the LED arrays 56 based on a vehicle 30 state of operation. The state of operation is a steering state such as when the vehicle 30 is entering a turn or turning; a vehicle speed or the acceleration of the vehicle; whether the operator has selected a high beam or a low beam function for the headlamp 52; or the like. An additional footprint 72 is for adjusted cutoff of the headlamp 52 based on vehicle 30 trim. Cutoff refers to design of the beam pattern 70 such that less light from a headlamp 22 travels into an opposing traffic lane and potentially interferes with other vehicle's vision. The various states of operation for use with the controller 68 are determined by sensors located in the vehicle, driver inputs, or the like.

The controller 68 additionally can illuminate combined footprints 72 within the LED array 56 based on multiple vehicle states of operation occurring simultaneously, such as when the vehicle 30 is slowing down and entering a corner, or if the vehicle is accelerating on to a higher speed and the driver selects a high beam function. The headlamp 52 additionally can have multiple functions that are served by the LED array 56, such as a forward beam headlamp, a turn signal lamp, an emergency lamp and a fog lamp. In an alternative embodiment the headlamp 52 may act as a rear combination lighting system including a tail lamp, stop lamp, and/or rear turn signal lamp.

The controller 68 may also cause the headlamp 52 to illuminate one of the footprints 72 in the LED arrays 56 based on an environmental state. An environmental state is adverse weather such as fog or rain or the like, ambient lighting such as twilight or night, the environment the vehicle 30 is travelling through such as rural, urban, or expressway, oncoming traffic or other close range vehicles, and other similar inputs. The environmental state is determined using a camera 73, charge coupled device (CCD) sensor, or the like connected to the controller 68. The camera 73 may be able to detect across the entire spectrum, or be able to detect in the visible spectrum, infrared spectrum, or both to provide input to the controller 68 regarding the current environmental state. The camera 73 may also be used to input information regarding the vehicle 30 state of operation, such as increasing speed or turning. The controller 68 can illuminate combined footprints 72 within the LED array 56 based on a vehicle state of operation occurring simultaneously with an environmental state.

Figure 8:
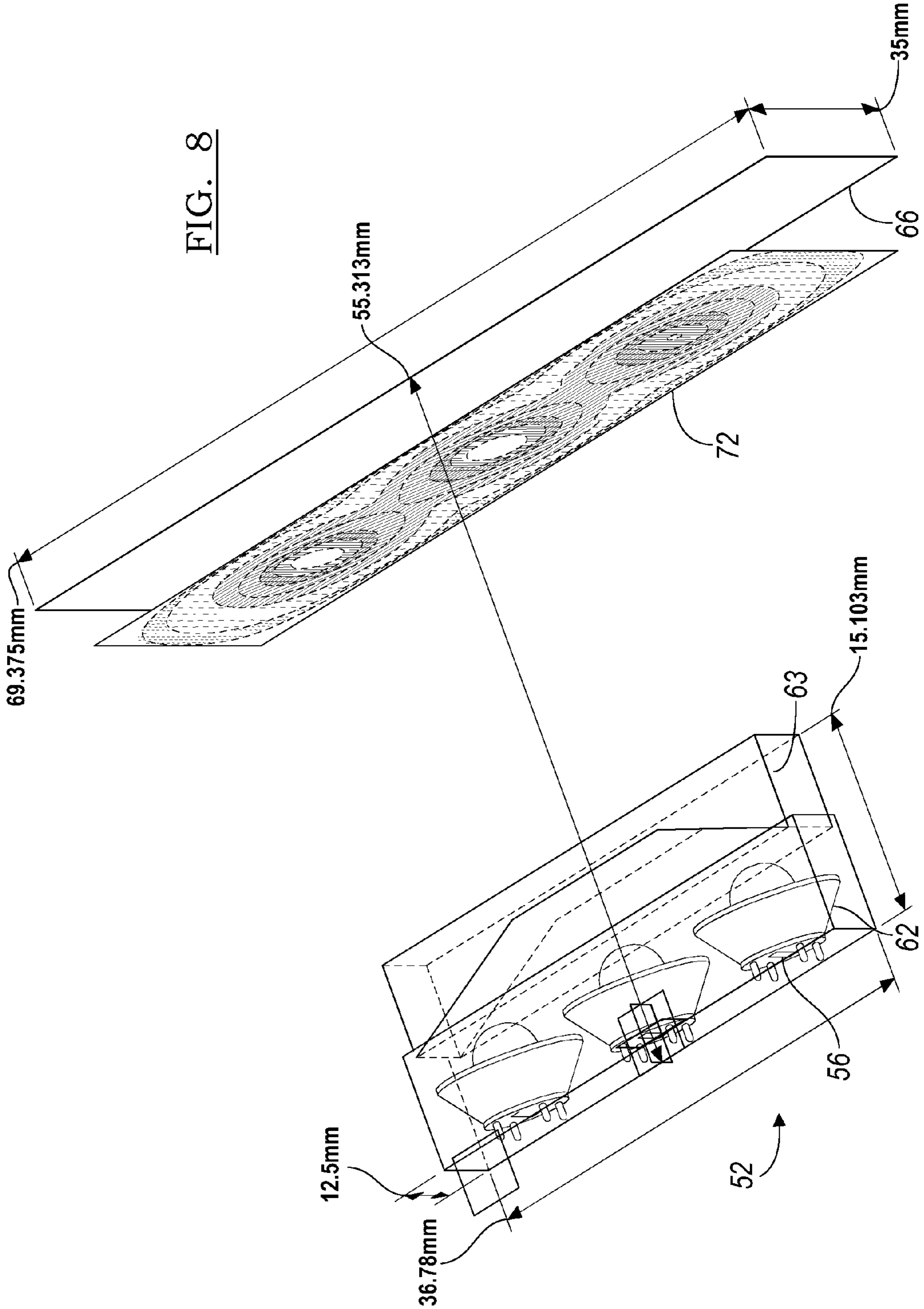
FIG. 8 is a schematic illustrating dimensions of the lighting system of FIG. 5 according to an embodiment.

FIG. 8 shows the headlamp 52 of FIG. 6 with an embodiment of dimensions for the headlamp 52. The scale in FIG. 7 applies to FIG. 8. The collimators 62 are in the near-field or overmolded with the LEDs 54. The microreplicated lenses 66 are placed a fixed distance from the collimators 62, and the prism 63 is placed at a fixed distance as well. The projection of a footprint 72 is also shown. The dimensions as shown are an example of the small size possible for the headlamp 52, and with the scaling possibilities come additional benefits and possibilities for packaging the headlamp 52 in a vehicle 30.

Figure 9:
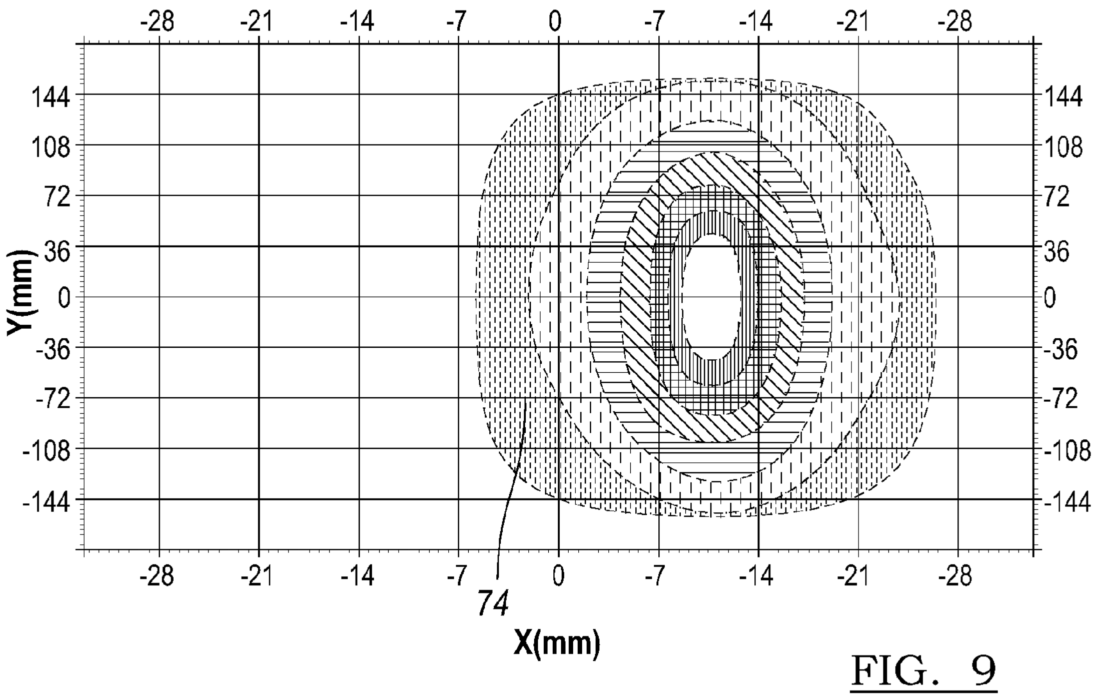
FIG. 9 is a spectral map illustrating a down the road orientation of an LED from the lighting array of FIG. 5.
Figure 10:
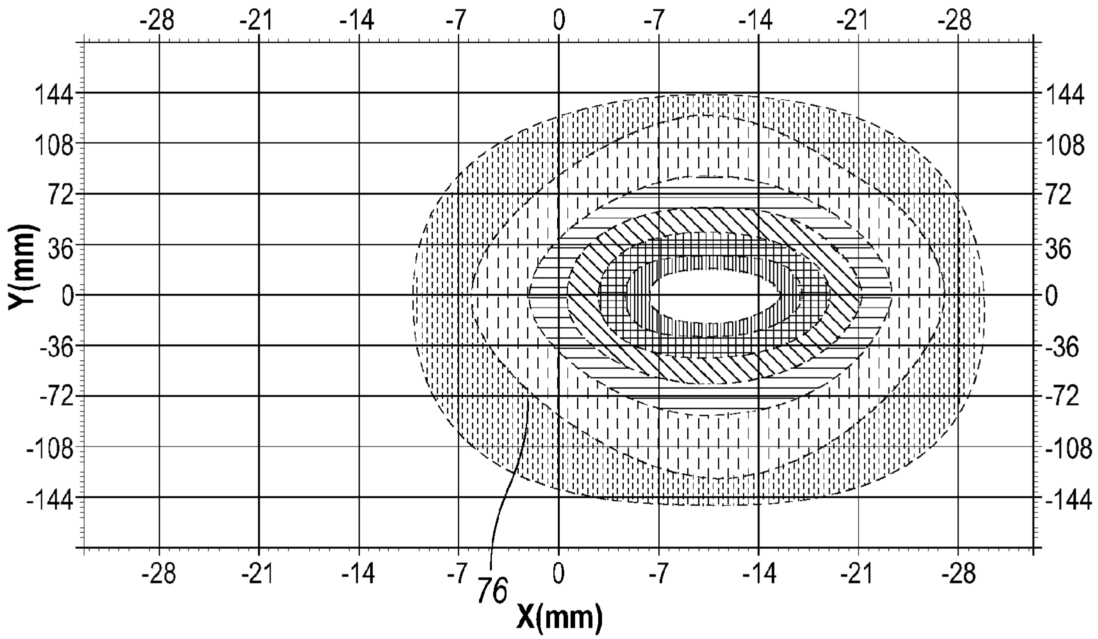
FIG. 10 is a spectral map illustrating a spread light orientation of an LED from the lighting array of FIG. 5.

FIG. 9 depicts an example of a down the road beam pattern 74, and FIG. 10 depicts an example of a spread light beam pattern 76. The scale in FIG. 7 applies to FIGS. 9-10. The light for the beam patterns 74, 76 is provided by an array 56. An array 56 may be configured to provide down the road lighting or spread lighting or both. Down the road lighting refers to the portion of the beam from a headlamp 22 that illuminates the road in the path the vehicle 20 is driving. For example, down the road lighting may have a hotspot that is 1-1.5 degrees and a 30:1 contrast ratio. Spread light refers to the light from the headlamp 22 that illuminates the roadway in a wider pattern, but does not travel as far from the vehicle 20 as the down the road lighting. Spread light may illuminate the shoulder or an adjacent lane for example. FIGS. 9-10 illustrate the corresponding luminescence resulting from different designs of the arrays 56, prisms 63, and microreplicated lenses 66 to produce either a spread light beam pattern 74 or down the road beam pattern 76 from an array 56.

Figure 11:
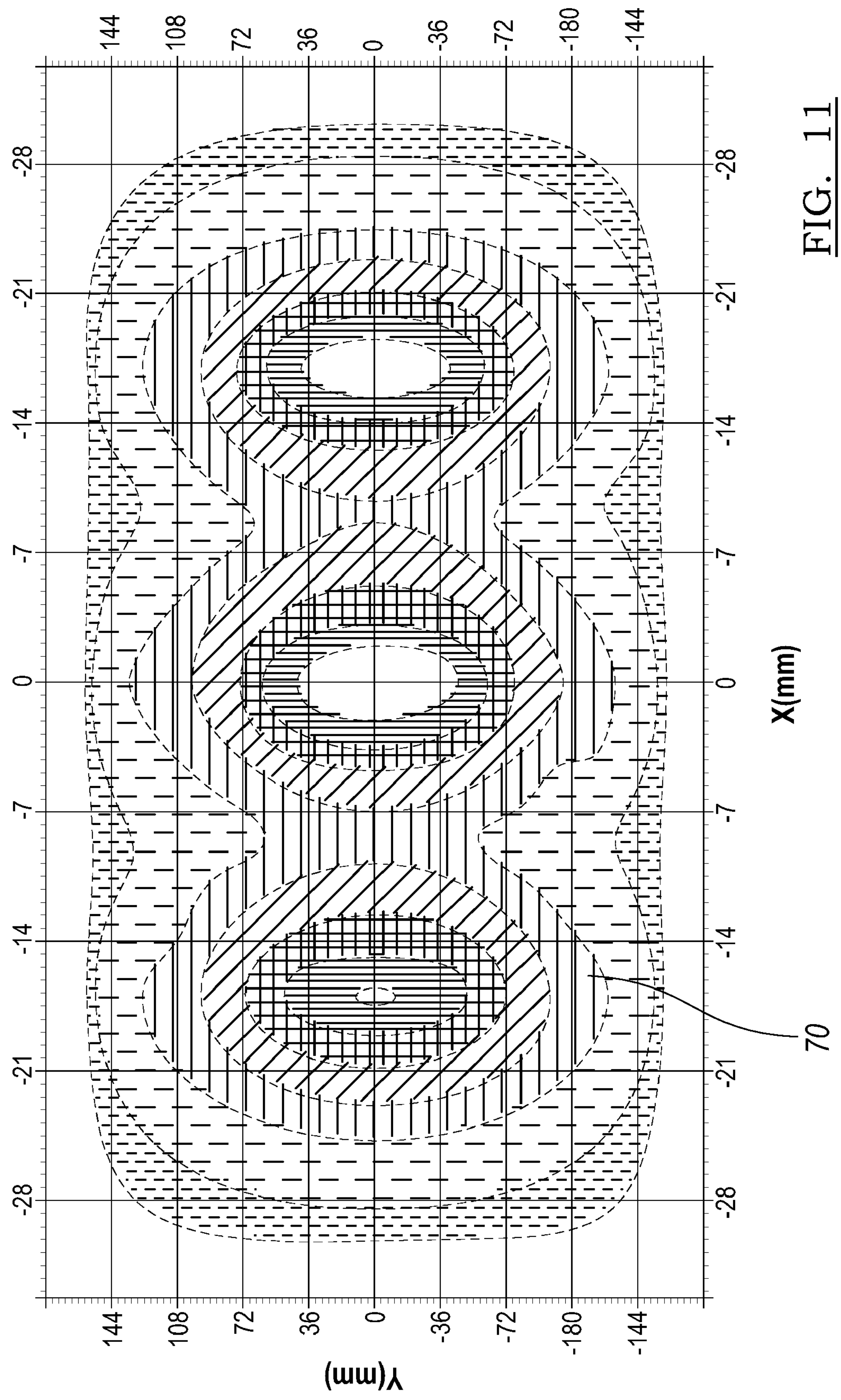
FIG. 11 is a spectral map of the lighting array of FIG. 5.

FIG. 11 depicts the footprint 72 from three arrays 56 of LEDs 54, or from a footprint 72 of three illuminated arrays 56 which are part of a larger array 56. The scale in FIG. 7 applies to FIG. 11. The footprint 72 is taken along a plane generally perpendicular to the direction of the light after it exits the prism 63 and before it enters the sheet of microreplicated lenses 66. Representative luminescence and dimensions are shown in the figure. The arrays 56 are emitting light in a down the road pattern 74 and the prisms 63 create spatial separation between the light emitted by each LED 54 in the arrays 56. The spatial separation and luminescence may change if a different LEDs 54, collimators 62, or prisms 63 were used. The microreplicated lenses 66 can further modify the footprint 72 in terms of focus, spread, direction, and the like into the beam pattern 70.

Figure 12:
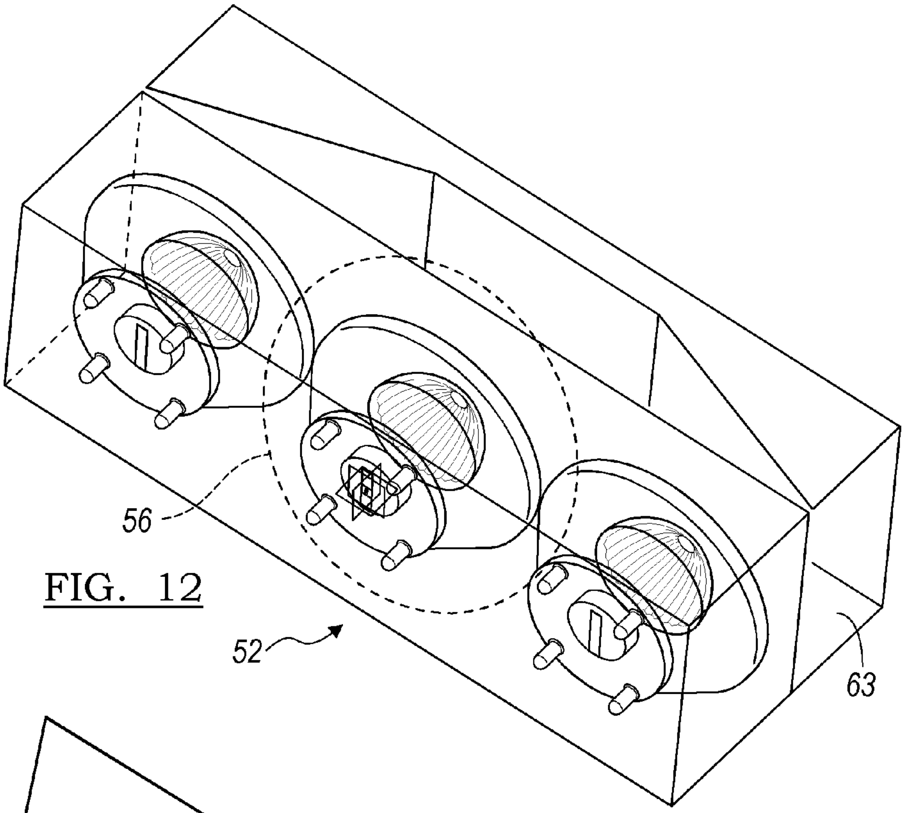
FIG. 12 is a perspective view of the lighting system of FIG. 5 with the central portion detailed.
Figure 18:
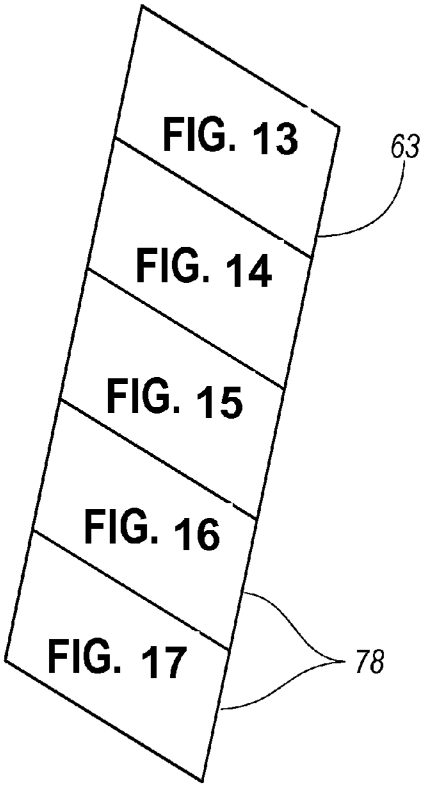
FIG. 18 is a schematic of the microreplicated lens from the detailed portion of FIG. 12.
Figure 13:
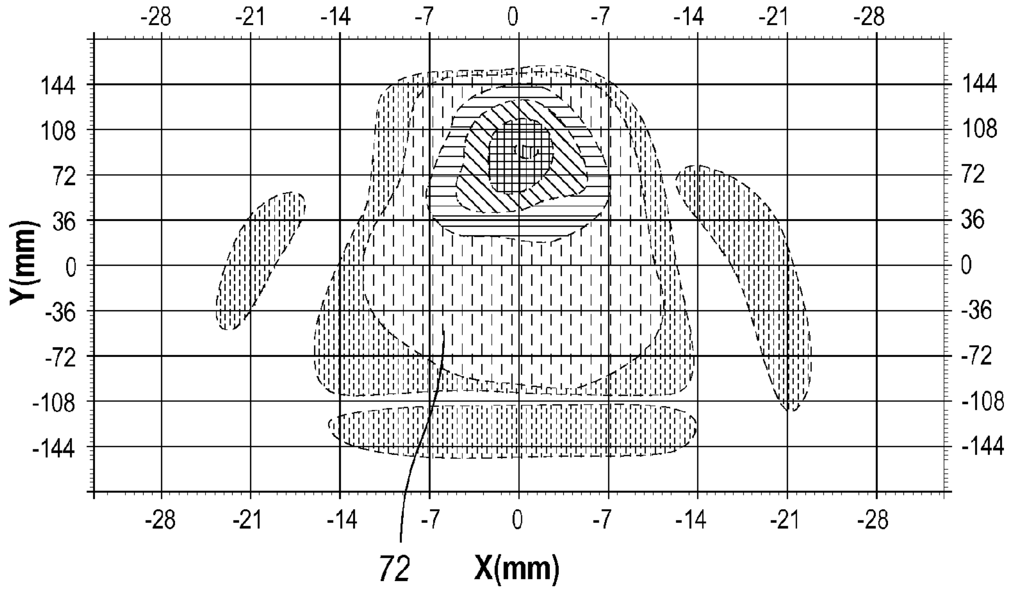
FIG. 13 is a spectral map from a section of the microreplicated lens of FIG. 12.
Figure 14:
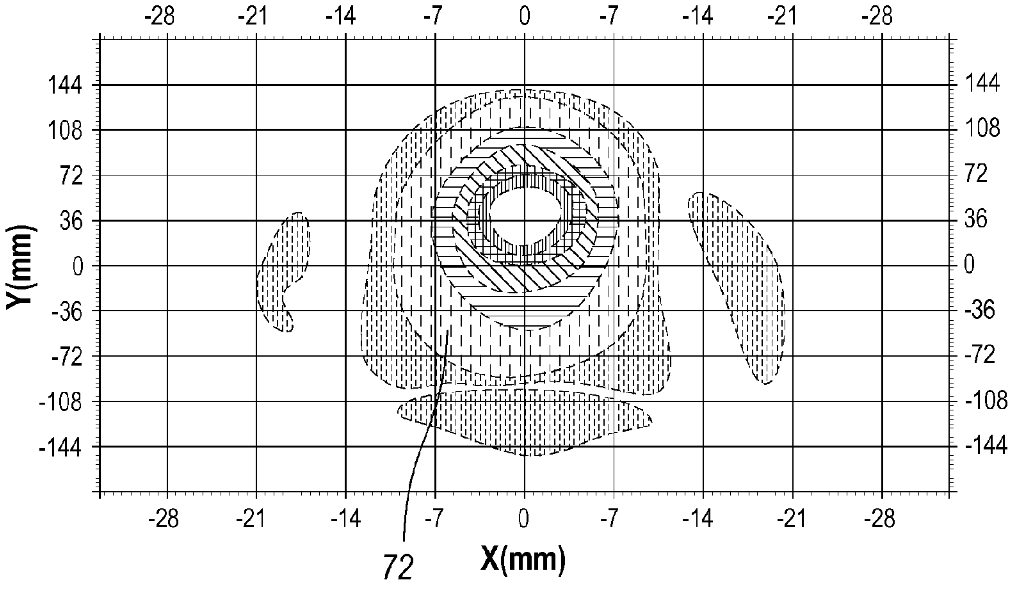
FIG. 14 is a spectral map from another section of the microreplicated lens of FIG. 12.
Figure 15:
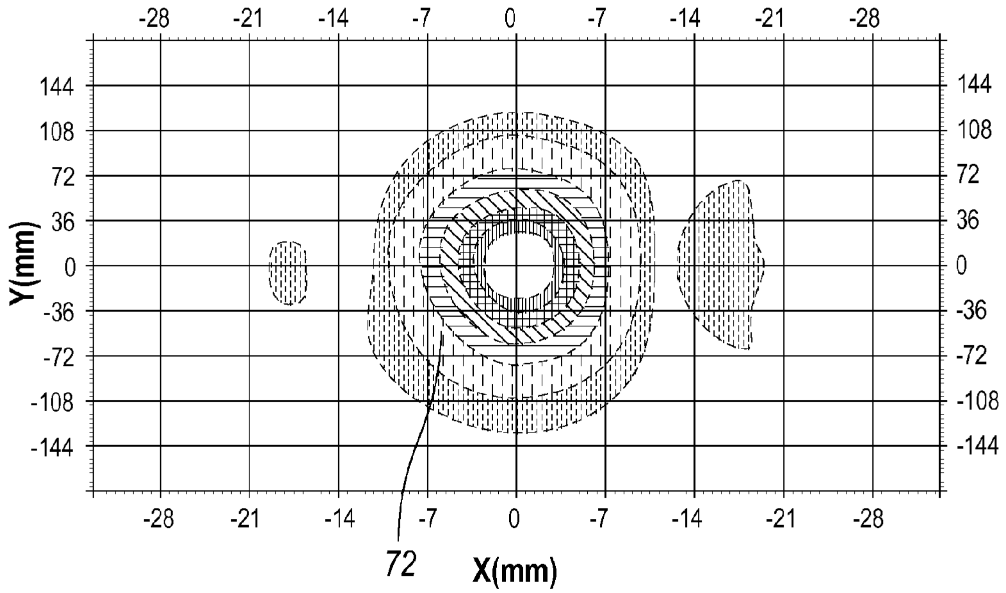
FIG. 15 is a spectral map from yet another section of the microreplicated lens of FIG. 12.
Figure 16:
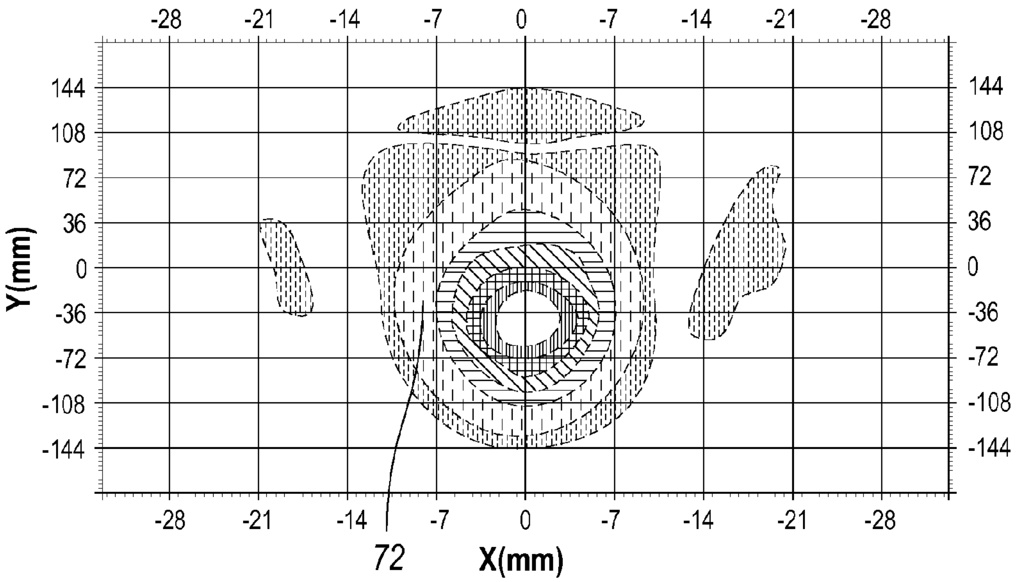
FIG. 16 is a spectral map from another section of the microreplicated lens of FIG. 12.
Figure 17:
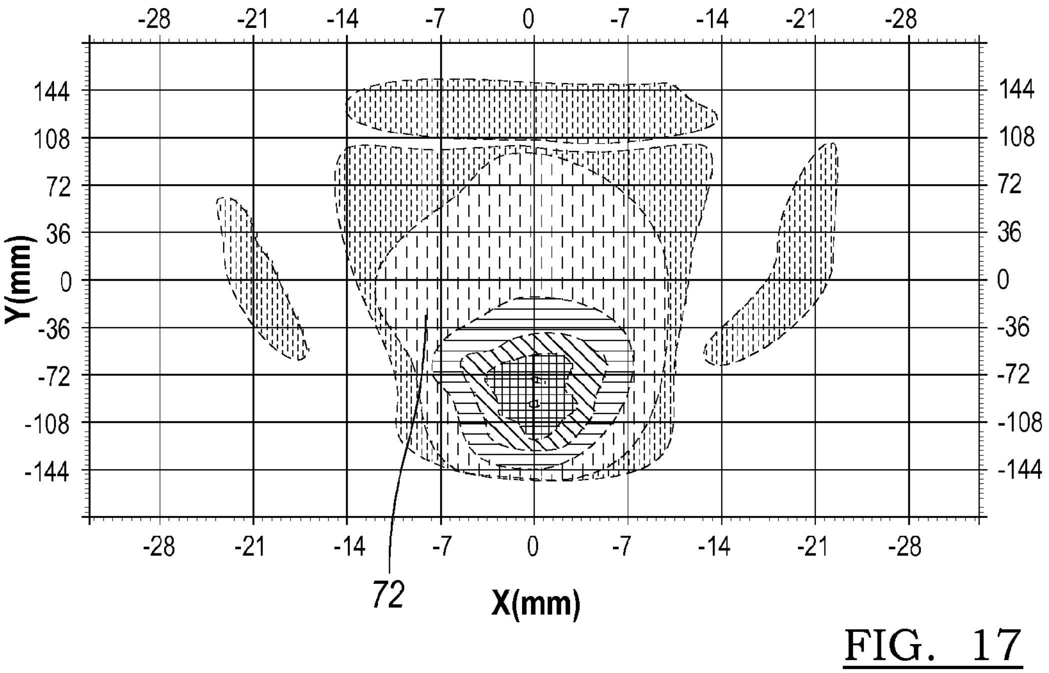
FIG. 17 is a spectral map from yet another section of the microreplicated lens of FIG. 12.
Figure 19:
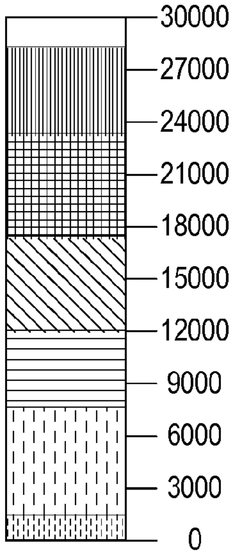
FIG. 19 is a luminance scale (cd/m^2) for FIGS. 13-17.

FIG. 12 shows the lighting system 52 of FIG. 5 with the central array 56 detailed and illuminated. As shown in FIG. 18, the prism 63 corresponding to the central array 56 is depicted and has five discrete optical sections 78, although any number of optical sections 78 or a continuous optical surface with varying shape are contemplated. A spectral map of the footprints 72 caused by each section 78 of the prism 63 are shown in FIGS. 13-17. Each section 78 in FIG. 18 is labeled with its corresponding, resulting footprint 72 in FIGS. 13-17. The luminance scale for FIGS. 13-17 is shown in FIG. 19 with units of candela per square meter. The prism 63 transmits the collimated light from the LEDs 54 in the array 56 to the microreplicated lens 66 and into a beam pattern 70. The upper and lower sections 78 of the prism 63 deflect, or steer the light to varying degrees to create the footprint 72 and spread the light emitted by LEDs 54 in the array 56.

Figure 20:
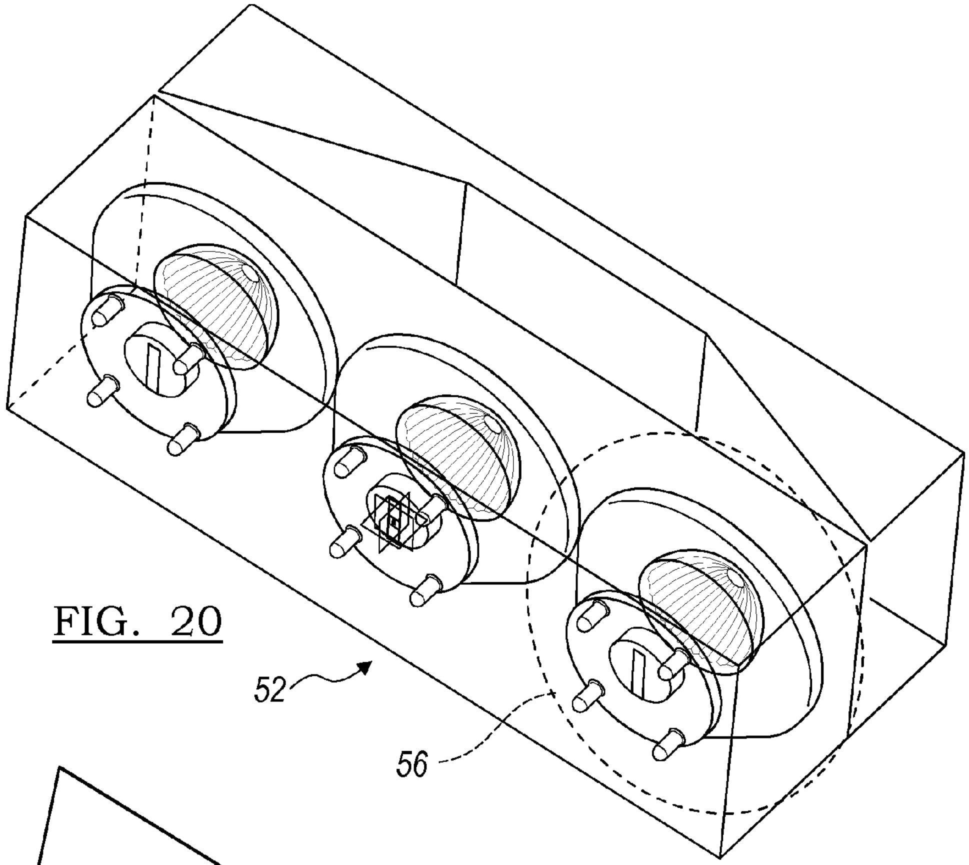
FIG. 20 is a perspective view of the lighting system of FIG. 5 with an outer portion detailed.
Figure 26:
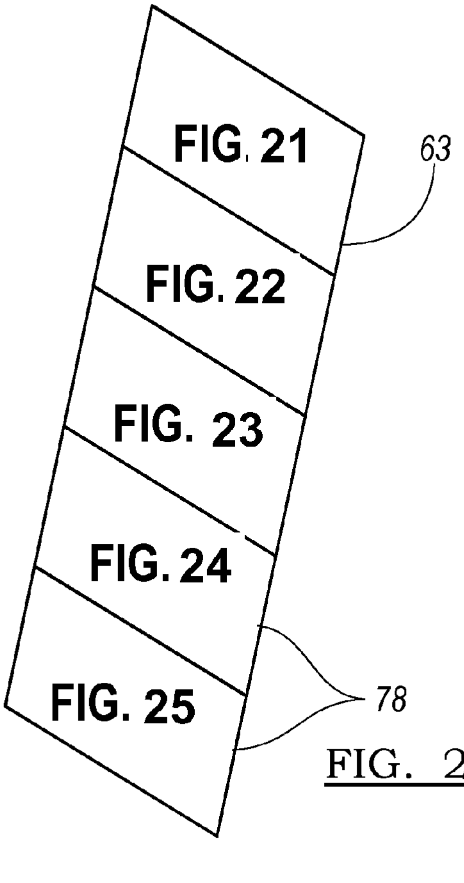
FIG. 26 is a schematic of the microreplicated lens of the detailed portion FIG. 20.
Figure 21:
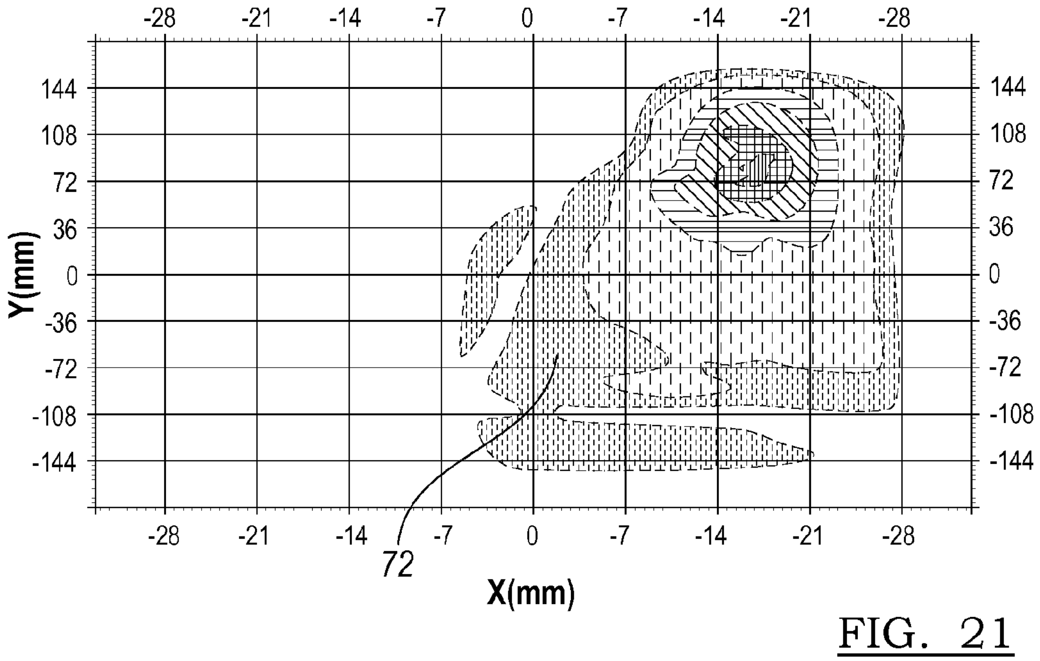
FIG. 21 is a spectral map from a section of the microreplicated lens of FIG. 20.
Figure 22:
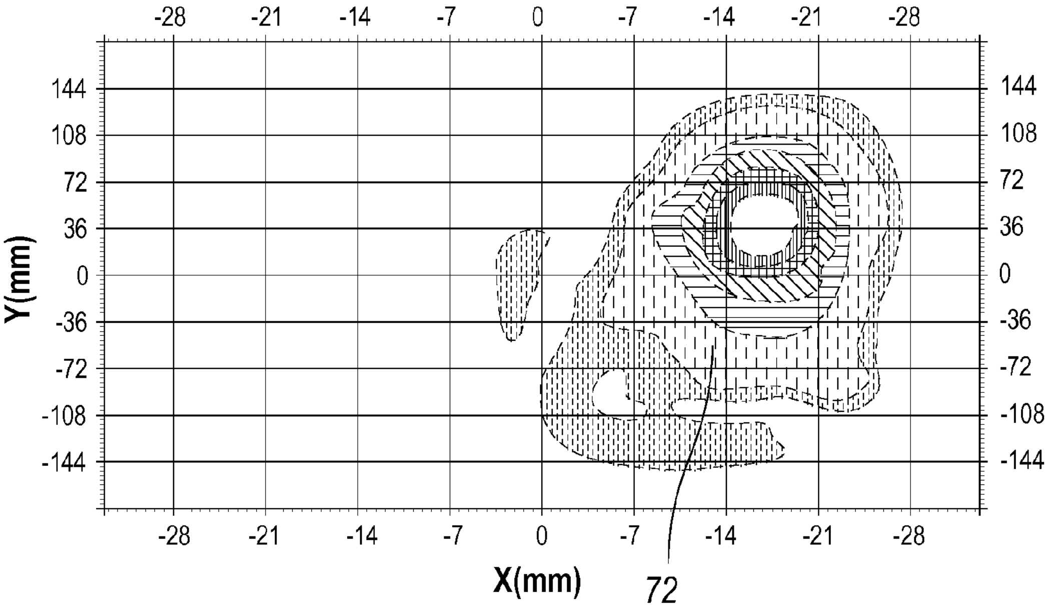
FIG. 22 is a spectral map from another section of the microreplicated lens of FIG. 20.
Figure 23:
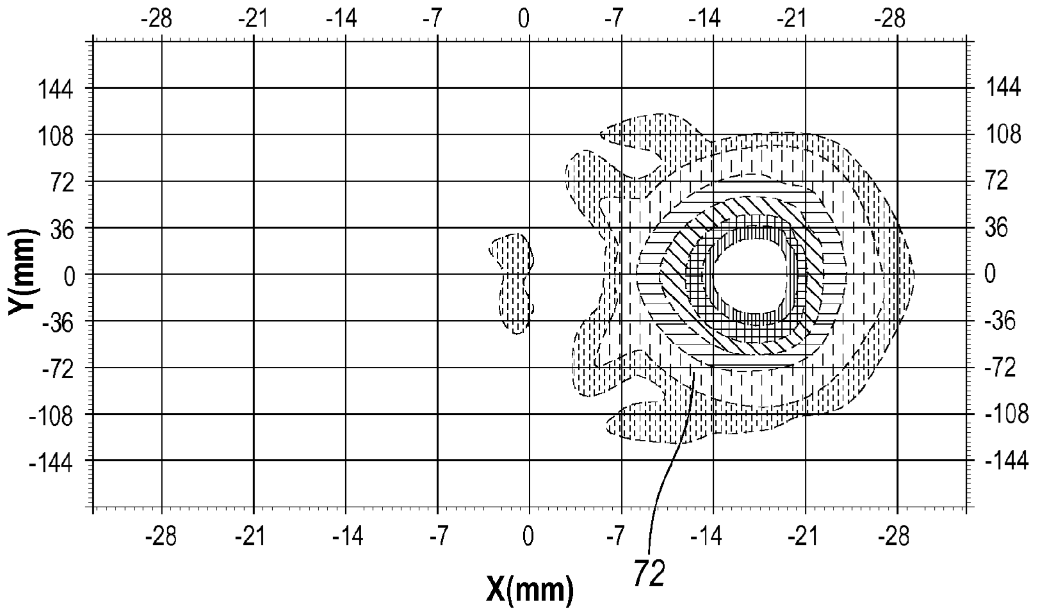
FIG. 23 is a spectral map from yet another section of the microreplicated lens of FIG. 20.
Figure 24:
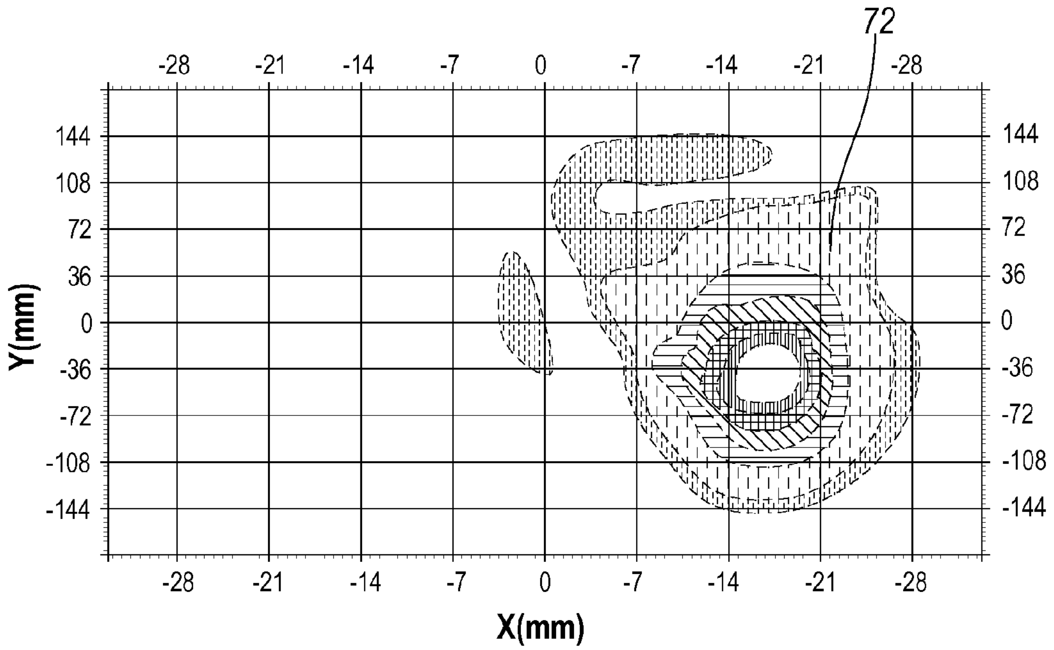
FIG. 24 is a spectral map from another section of the microreplicated lens of FIG. 20.
Figure 25:
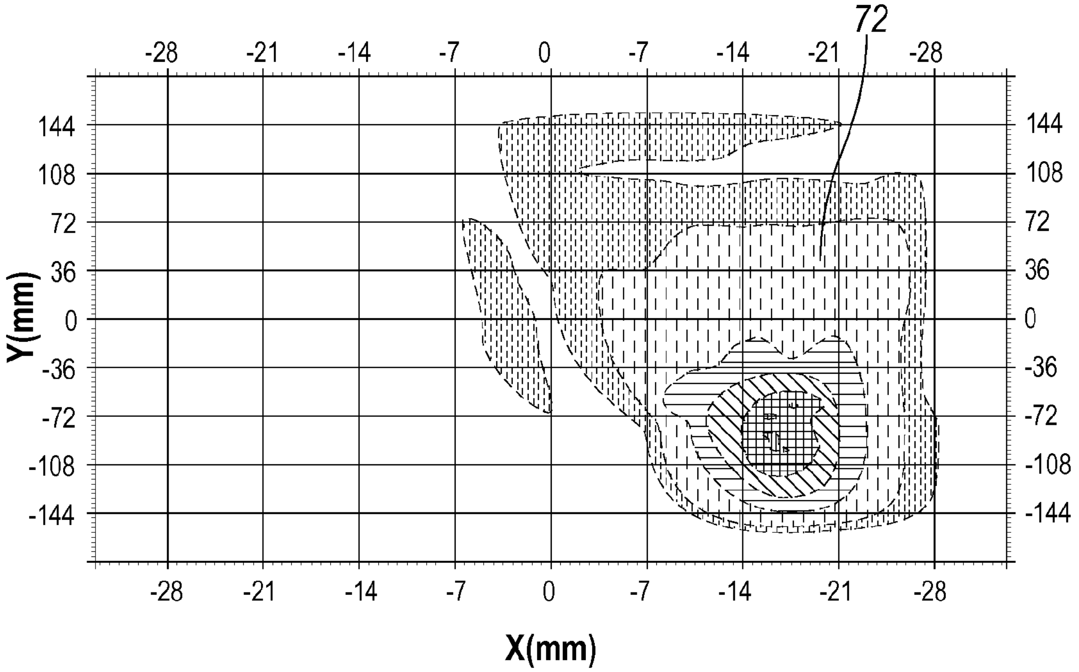
FIG. 25 is a spectral map from yet another section of the microreplicated lens of FIG. 20.
Figure 27:
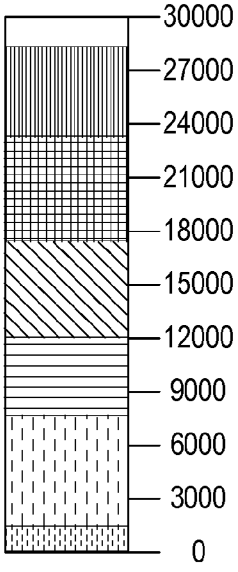
FIG. 27 is a luminance scale (cd/m^2) for FIGS. 21-25.

FIG. 20 shows the lighting system 52 of FIG. 5 with an outer array 56 detailed and illuminated. The prism 63, as shown in FIG. 26, interacts with the collimated light from the corresponding array 56 and LEDs 54, and has five optical sections 78, although any number of optical sections 78 is contemplated. Each section 78 in FIG. 26 is labeled with its corresponding, resulting footprint 72 in FIGS. 22-26. FIG. 27 is a luminance scale for FIGS. 21-25 in units of candela per square meter. The optical sections 78 are prismatic in order to deflect and spread light both into the desired footprint 72 to create spatial separation between the LEDs 54 and from the footprint 72 of an adjacent array 56.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed:

1. A vehicle exterior lamp comprising:

a plurality of light emitting diodes (LEDs) positioned into an array, the array having at least one row and at least two columns, each LED positioned at an intersection thereof, wherein at least one of the LEDs is illuminated by selectively applying a signal to the row and a signal to the column corresponding to the position of the LED; and a sheet of microreplicated lenses positioned to interact with light emitted from the at least one illuminated LED.

2. The vehicle exterior lamp of claim 1 further comprising a controller to selectively apply signals to the columns and rows of the array.

3. The vehicle exterior lamp of claim 2 wherein vehicle exterior lamp is a headlamp and the LED array is oriented such that the LEDs emit light in a generally perpendicular direction to the output of the headlamp.

4. The vehicle exterior lamp of claim 1 further comprising a beam collimator to generally collimate at least a portion of light emitted from an illuminated LED into a directed beam to the sheet of microreplicated lenses.

5. The vehicle exterior lamp of claim 1 wherein at least two of the plurality of LEDs are illuminated by selectively applying a voltage to the rows and to the columns corresponding to the respective positions of the at least two LEDs, thereby forming an illuminated footprint.

6. The vehicle exterior lamp of claim 5, wherein the sheet of microreplicated lenses is configured to produce a predetermined spread light beam pattern from light emitted by a footprint.

7. The vehicle exterior lamp of claim 5, wherein the sheet of microreplicated lenses is configured to produce a predetermined down the road beam pattern from light emitted by a footprint.

8. The vehicle exterior lamp of claim 5 wherein the LED array is configured to produce a plurality of footprints.

9. The vehicle exterior lamp of claim 8 wherein the controller causes the illumination of one of the footprints from at least one vehicle state of operation.

10. The vehicle exterior lamp of claim 9 wherein the state of operation further comprises one of a steering state of a vehicle, speed of a vehicle, and high and low beam selection.

11. The vehicle exterior lamp of claim 8 wherein the controller causes the illumination of one of the footprints from at least one environmental state.

12. The vehicle exterior lamp of claim 11 further comprising a camera to sense the environmental state and provide an input to the controller.

13. The vehicle exterior lamp of claim 8 wherein the controller causes the illumination of at least two of the plurality of footprints.

14. The vehicle exterior lamp of claim 1 wherein the lens further comprises an outer cover.

15. The vehicle exterior lamp of claim 1 wherein the lamp acts as one of a forward headlamp, turn signal lamp, parklamp, foglamp, and emergency lamp.

16. The vehicle exterior lamp of claim 1 wherein the lamp acts as a rear combination lamp.

17. A vehicle headlamp comprising:

a sheet of microreplicated lenses for refraction of light; and a plurality of light emitting diodes (LEDs) for selectively emitting light;

wherein light emitted by the LEDs is directed towards the sheet, interacts with the sheet, and the light then exits the headlamp in a generally perpendicular direction to the LED emitted light.

18. A vehicle headlamp comprising:

a plurality of light emitting diodes (LEDs) positioned into an array having at least one row and at least two columns, wherein at least one of the LEDs is illuminated by selectively applying a signal to the row and a signal to the column corresponding to the LED position; and a sheet of microreplicated lenses positioned to interact with light emitted from the at least one illuminated LED.

* * * * *